(12) United States Patent
Backer et al.

(10) Patent No.: US 8,401,921 B2
(45) Date of Patent: Mar. 19, 2013

(54) SELLER-DRIVEN METHOD FOR A BID SET SYSTEM

(76) Inventors: Alejandro Backer, Altadena, CA (US);
Reginald Keith Swinford Ammons, Portland, OR (US)

( * ) Notice: Subject to any disclaimer, the term of this patent is extended or adjusted under 35 U.S.C. 154(b) by 961 days.

(21) Appl. No.: 11/881,371

(22) Filed: Jul. 25, 2007

(65) Prior Publication Data

US 2008/0027854 A1      Jan. 31, 2008

Related U.S. Application Data

(60) Provisional application No. 60/846,492, filed on Sep. 21, 2006, provisional application No. 60/930,880, filed on May 18, 2007.

(51) Int. Cl.
*G06Q 40/00* (2012.01)
(52) U.S. Cl. .................... 705/26.3; 705/26.1; 705/37
(58) Field of Classification Search .............. 705/26.1, 705/26.3, 37
See application file for complete search history.

(56) References Cited

U.S. PATENT DOCUMENTS

| 7,555,485 | B2 * | 6/2009 | Soulanille | 1/1 |
| 2002/0072974 | A1 * | 6/2002 | Pugliese et al. | 705/14 |
| 2006/0161534 | A1 * | 7/2006 | Carson et al. | 707/3 |
| 2007/0055616 | A1 * | 3/2007 | Clay et al. | 705/37 |

OTHER PUBLICATIONS

Auction defender: Ebay tracking, Bidding and Sniping (retrieved from http://www.auctiondefender.com).
Bidnapper.com (retrieved form http://www.bidnapper.com/faqs.php3).
HarvEX/Turbo-Sniper : Manual (retrieved from http://www.xellsoft.com/harvex_manual.html#bid_manager).
Using Bid Assitant (retrieved from http://pages.ebay.com/help/buy/bid-assistant.html#group).
True Snipe Aution Sniper (retrieved from www.truesnipe.com).

* cited by examiner

*Primary Examiner* — Muriel Tinkler
(74) *Attorney, Agent, or Firm* — Steinfl & Bruno, LLP

(57) ABSTRACT

A method for automatically bidding on multiple on-line auction items up for bid where the number of items the bidder wishes to buy is less than the number of items up for bid is disclosed. A method of a seller or auction site giving a bidder the ability to add a listing to a set of listings that can be processed as above is also disclosed.

14 Claims, 4 Drawing Sheets

SELLER-DRIVEN METHOD FOR A BID SET SYSTEM

CROSS REFERENCE TO RELATED APPLICATIONS

This application claims benefit to U.S. provisional applications 60/846,492 filed on Sep. 21, 2006, for "System to bid to win one or more of multiple listings" by Alejandro Backer, et al. and 60/930,880 filed on May 18, 2007, for "Multi-item Bidder Enhancement" by Alejandro Backer, et al., the disclosure of all of which is incorporated herein by reference.

FIELD

The present disclosure is generally directed to facilitating the use of on-line auctions, specifically, to a seller-driven method for a bid set system. More in particular, this disclosure is directed to an improved method of bidding on multiple items at the same time where the desired set of items is less than the number of items available to bid on.

BACKGROUND

Auctions are a means of selling items by placing items up for bid, collecting bid prices from a number of buyers, and then selling the item to the highest bidder. It is believed that auctions have been used as least as early as 500 B.C. when women were auctioned off as wives to Babylonian men.

In 1995, the auction process reached the Internet when a Japanese company auctioned off used cars over the Internet. Later that year eBay started an on-line auction website that allowed users to not only bid on items, but also place items up for bid. Today eBay has over 181 million registered users worldwide and in 2005 handled a gross merchandise volume of $44.3 billion. Since 1995, many other on-line auction sites have opened allowing anyone with Internet access to participate as either a buyer or a seller. Online sites have auctioned items ranging from a single kidney bean to a Gulf Stream jet airplane.

Most auction sites allow the bidder to search for items by keyword or browse by category. Once the items matching the bidder's criteria are found, they are listed along with information such as a description of the item, the item's selling price, the time left on the item, the item's current price, the top bidder of the item, and a picture of the item. The bidder can then decide if they wish to place bids on one or more of the items listed.

However, each item search invariably yields multiple sellers offering comparable items. Buyers often want "any one of these", so several of the listings would be suitable, but the auction system allows the buyer to bid on only one seller's auction at a time (unless, of course, the buyer is trying to buy multiple items).

This means buyers that would otherwise be quite satisfied with one seller's listing end up bidding on another seller's listing. What is worse, there is very little chance the buyer will return to the first seller, or possibly any seller, if the buyer loses the auction for the other listing.

Since there is only one winner per auction, this means scores of buyers who could be happy with an equivalent item will never bid on it.

SUMMARY

The current disclosure regards a method and system that allows people (users) to create "bid sets": a listing of comparable online auction items up for bid, where the number of available items typically exceeds the number of items the user wants to buy.

The following is an example of how this method could be implemented. It should be kept in mind that the process is not necessarily a linear one and the following steps might occur in a different order than presented here or occur more than once per process cycle. The user selects one or more listings from an online auction website, such as eBay, and places their identifying information ("ID") into a bid set—a collection of listing IDs in a database. The bid set the listings are placed in can be an existing bid set, or a new bid set can be created for the listings. The bid set database typically contains a set of listings IDs to be bid on, the maximum price the user will pay for each listing (or one price for all listings in the bid set), and the number of listings the user wishes to win bids on. The bids in the bid set can be prioritized by criteria supplied either by the user or by the system (i.e. default criteria). The system then uses the listing ID of the highest priority listing to determine the network location of the listing. The system then bids on the highest priority listing until the user wins the item, the listing's price exceeds the maximum price the user will pay for that item, or the item is removed from the auction.

If the user wins the item and the user has won his desired number of items, then the system stops bidding on items in that bid set.

If the user wins the item and the user has not won his desired number of items, then the system starts the bidding process with the next highest priority item.

If the price of the item exceeds the maximum price set by the user, then the system stops bidding on that item and starts the bidding process with the next highest priority item.

If the item is removed from the auction for some reason, then the system starts the bidding process with the next highest priority item.

Once the user has won the desired number of items from the bid set, or if the bid set has no more items to bid on, the process ends.

In some embodiments of the disclosure, the bidding is done programmatically by software in computer-readable media and/or hardware.

In some embodiments, monitoring of auctions is carried out by a programmatic interface monitoring the auction through an API (Application Programming Interface).

In some embodiments, auction monitoring is carried out by an automated system, such as a program that periodically checks the contents of auction site webpages for auction results.

In other embodiments, auction monitoring is carried out by an email notification system between the auction website and the bidding system.

In some embodiments, the multi-item bidding system is integrated into the auction website.

In one embodiment of the disclosure, bidders submit different bids for different items in a bid set.

In one embodiment of the disclosure, the bidding system submits each bid a short time before the end of the corresponding auction. This allows bidders maximum time to continue to add listings to their bid set before a decision is made as to the listings' priorities and thus the order in which they will be bid on.

In one embodiment of the disclosure, the method is performed by a server connected to the Internet. In one embodiment of the disclosure, the method is performed by client software connected to the Internet.

In some embodiments, the user interface allows the user to drag and drop items from one or multiple auction and/or e-commerce websites into their bid set of objects to be bid on.

It is preferable that the bidding be done programmatically by software in computer-readable media and/or hardware.

In some embodiments, every time a bidder bids or adds an item to his/her bid set, an automated system presents similar or related items for inclusion in the bid set based on the characteristics of the listing, such as product description, product manufacturer, size, color, and model number. In some embodiments, listings from the same seller as the listing selected are presented preferentially (e.g. above others, or with a more salient typography or display characteristics).

In some embodiments, the bid set system delivers targeted advertisements to prospective buyers that are related to the listings they have indicated an interest in. For example, advertisers could pay for placement of their advertisements. Further, the advertisers could pay for placement of ads when particular keywords are shown. Advertisers could pay per impression. Optionally, the advertisers could choose to pay per click, and the system could optimize the timing of when to show the advertisements in order to maximize the click through rate for those ads. Alternatively, the advertisers could pay per bid, and the system will optimize when to show the advertisements in order to maximize the number of bids. Alternatively, advertisers could pay per purchase, pay per dollar of purchase amount, or pay different amounts for each of more than one of the above, i.e. impressions, clicks, bids, purchases or purchase value. For any of the above embodiments, the payment could be handled through a bidding system itself, i.e. the advertisers could bid for the placements.

In some embodiments, an automated system searches one or more auction websites to find items related to those the prospective buyer/user has expressed an interest in by comparing the characteristics of the listings; for example: if the user is interested in bidding on a red, short-sleeve shirt, the system find other listings for other red, short-sleeve shirts. In one embodiment, the results of this search are provided to the user as a list. In some embodiments, the related items are automatically searched for if and when the user loses the auctions for all the listings he or she had selected. In some embodiments, the list of related items are provided to the user for approval before the system bids for them. In some embodiments, such request for approval is via email; in others via a web interface; in others through a pop-up in the user's computer; in others through text messages to a phone; in others through voice messages; in others through RSS messaging. In another embodiment, the system automatically adds the related items to a bid set and processes the bid set without confirmation from the user.

In some embodiments, listings are identified with a code unique to each different type of item (e.g. a stock keeping unit, or "SKU"), and bids for a listing can be interpreted as a bid for any item identified with the same code in comparable condition (e.g. new).

In one embodiment, either the seller or auction provider can place a webpage form element—such as a graphical user interface (GUI) button, text link, GUI checkbox, or GUI option button—with the listing up for bid. The bidder then only needs to activate the element to add that listing to a bid set. The code for the element is provided by the bid set system website. In embodiments where the seller is responsible for placing the element, the seller may add the code along with the description when he enters the item into the auction system. In embodiments where the auction provider (e.g. eBay) places the element, the element can be included by default in all listings. The code could be in HTML, JavaScript, Flash, AJAX or any similar web-friendly language. The listing can be identified implicitly based on the URL information included in referrer information in the HTTP request to the bid set system, i.e. identification is made by identifying the webpage from which the action was called and selecting the identifying information either from the URL string or from the web page itself. Alternatively, the listing identification can be included in the element code and be returned to the bid set system as a variable in the call. An example of what an HTML version of this code could look like for a GUI button is <p><a href=http://www.1ofthese.com/?Page=SellerNCRU.aspx&Item=YourItemNumber target="_blank"><img src="http://www.1ofthese.com/1of these/Web/Style/images/add_bidset.gif" border="0"/></a></p> where "www.1ofthese.com" is the web server for the bid set system and "add_bidset.gif" is the image file of the GUI button. In embodiments where the present invention is integrated with the auction website, the listing can be identified without the need to use URL or referrer, using a parameter of the function called by the element.

If the buyer who activates the element is not currently logged into the bid set system, then the system prompts the buyer either to log in, if they have an account, or to establish an account, if they do not already have one. Once logged in, the bid set system processes the bid set as usual. In some embodiments, the present invention is integrated with the auction website, and there is no need to log into the bid set system separately from the auction website.

If the buyer has already logged onto the bid set system, the activation may be sufficient to place an item in the user's bid set. In this way, the user can select several listings to be placed on the bid set without having to revisit the bid set website.

In another embodiment, bidders may add an item to a bid set by performing an action at a webpage listing multiple items available for sale. For example: checking a check box adjacent to a picture or description of the corresponding item or listing, and then clicking a button elsewhere on the page. Alternatively, the selection may be made by clicking a button next to a listing in a list of listings.

Another embodiment of the disclosure includes an automated system that takes into account the utility functions or preferences of several bidders and sellers in an auction and matches the bidders to the sellers in a way such that no change can be made to the matches without reducing someone's utility. For example, each buyer could either state an order of preference of listings or how much he or she is willing to pay for each listing and each seller could explicitly or implicitly state an order of preference of buyers (usually the more a bidder offers, the higher a seller's preference for him or her). One embodiment of this follows: the buyer who bids the most (and is thus most desirable to sellers) is assigned his or her top choice, and that listing is removed from available choices. The buyer who bids second most is assigned his or her top choice from among the available choices. The process then repeats until all listings are filled.

Another embodiment of the disclosure includes a method of automatically finding auction items that are about to sell at price below a calculated "fair" price and bids for them. If the item is won, an automated system automatically re-sells the item at a higher price in a subsequent auction. A "fair" price might be an average price or some pre-determined function of the distribution of historical prices. In one embodiment of this, the delivery address of the re-seller user (the original buyer and subsequent seller) is not provided to the original seller until the delivery address of the subsequent buyer has been provided to the re-seller.

According to a first aspect of the present disclosure, a method for bidding on on-line auction listings is provided, comprising the following steps: (a) selecting a plurality of listings to bid on from an on-line auction, wherein each listing has an identification; (b) determining a number of listings required to be won; (c) storing the identification of each of the plurality of listings in a bid set database, wherein each listing has a corresponding record containing the identification; (d) selecting the first record from the bid set database after at least one listing has been stored; and (e) bidding on the listing that corresponds to the selected record after the first record is selected; the method further comprising: if the bidding results in success: decrementing the number of listings required to be won; if, after the decrementing, the number is zero, ending the process; and if, after the decrementing, the number is greater than zero, selecting the next record in the bid set database and, if the record exists, repeating step (e); and if the bidding results in failure: selecting the next record in the bid set database and, if the record exists, repeating step (e); wherein steps (c), (d), and (e) are performed by a computer.

According to a second aspect of the present disclosure, a method for adding an on-line auction listing to a bid set is disclosed, comprising: providing a webpage form element corresponding to an on-line auction listing; identifying the on-line auction listing by information provided by the webpage form element; storing the on-line auction listing into a bid set database based on the information provided by the user interface element, wherein the bid set database contains zero or more on-line auction listing records; and running computer software that performs a task of bidding on at least one on-line auction listing if the bid set database has at least one on-line auction listing record.

According to a third aspect of the present disclosure, a method for adding an on-line auction listing to a bid set is disclosed, comprising: providing a user interface element corresponding to an on-line auction listing on an on-line auction website; identifying the on-line auction listing by information provided by the user interface element; storing the on-line auction listing into a bid set database based on the information provided by the user interface element, wherein the bid set database contains zero or more on-line auction listing records; bidding on at least one on-line auction listing if the bid set database has at least one on-line auction listing record.

According to a fourth aspect of the present disclosure, a method for conducting an on-line auction is disclosed, comprising: collecting the requirements from each bidder from a plurality of bidders, including a seller priority value of each seller from a plurality of sellers said each bidder wishes to be matched to, wherein for each bidder each seller has a different seller priority value and the highest seller priority value indicates the seller said buyer most wants to buy from; collecting the bid values from each bidder from a plurality of bidders, wherein there is a highest bid value and a lowest bid value; and matching one-to-one said plurality of bidders to said plurality of sellers, the matching comprised of the steps: (a) prioritizing the bidders by bid value, such that the highest bid value corresponds to a highest priority; then (b) matching a bidder from said plurality of bidders who has a priority value equal to or greater than each other bidder and who has not yet been matched to any seller from said plurality of sellers to a seller from said plurality of sellers who has a seller priority value for said bidder greater than any other seller who has not yet been matched to any bidder from said plurality of bidders and who has not yet been matched to any bidder; and then (c) repeating step (b) until the plurality of bidders are matched to sellers or the plurality of sellers are matched to bidders.

According to a fifth aspect of the present disclosure, a method for enhancing on-line auction purchases is disclosed, comprising: determining a fair price for an auction listing for a set of goods; monitoring the auction listing bid price of the auction listing; bidding on the auction listing if the auction listing bid price is below the fair price; and if the bidding is successful, placing the set of goods in a new auction listing wherein the new auction listing bid price is higher than the auction listing bid price; wherein the above steps are performed by a computer.

According to a sixth aspect of the present disclosure, an internet computer server system is disclosed, comprising: a web server for collecting hypertext transfer protocol messages; a bid set system connected to the web server, the bid set system comprising: a database for storing auction listings and a bidding engine for bidding on auction listings; wherein the bid set system is adapted to determine buyer identification and auction listing identification based on the content of the hypertext transfer protocol messages.

BRIEF DESCRIPTIONS OF THE FIGURES

DETAILED DESCRIPTION

Figure 1:
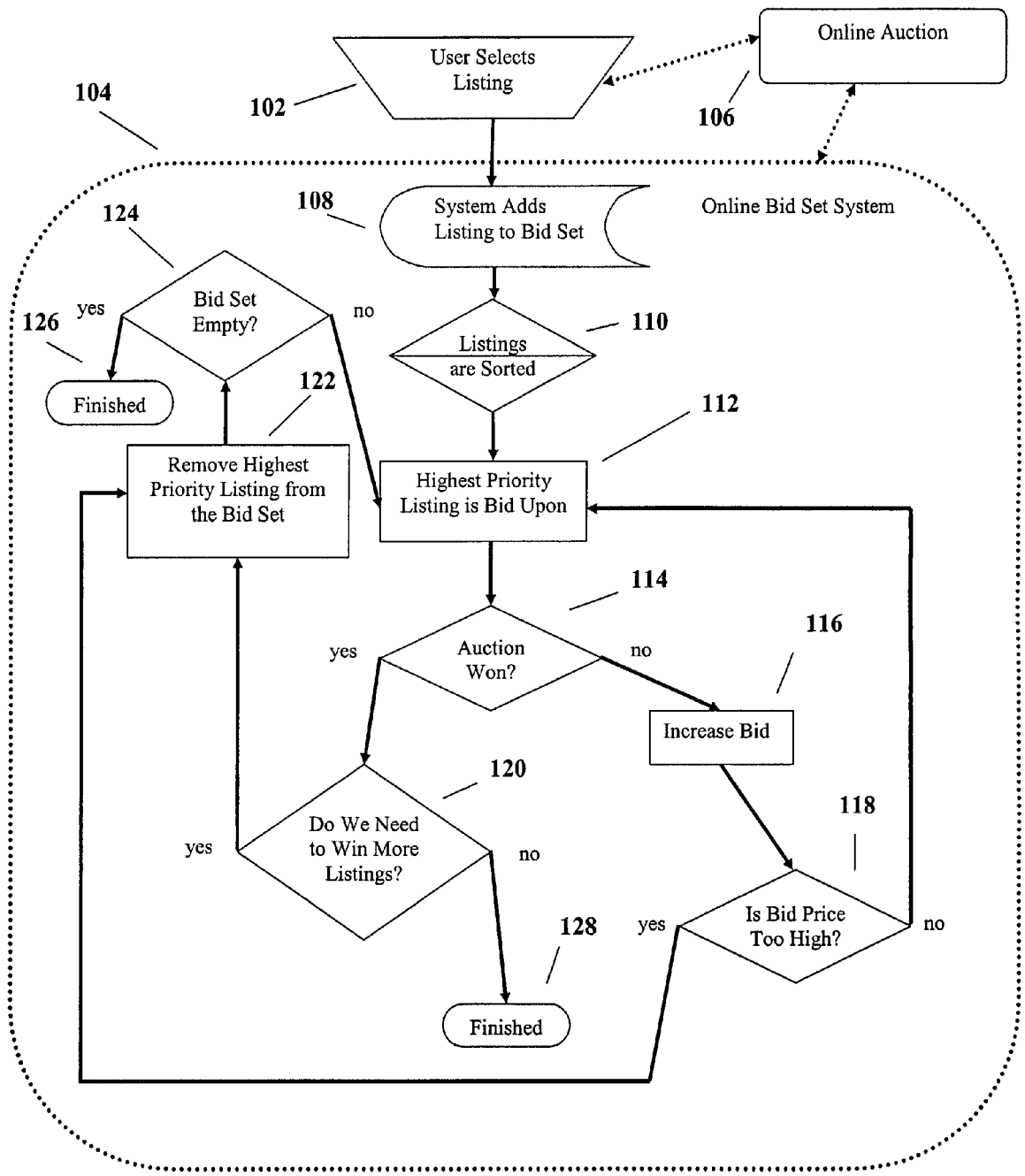
FIG. 1 is a flowchart showing an embodiment of the bid set system.

FIG. 1 gives a flowchart for an embodiment of the bid set method. First, a buyer (user) selects a bid listing they want to bid on 102 from an online auction 106. The user also tells the bid set system what the maximum price the user is willing to bid for that listing and how many listings the user needs to win. Then, the user instructs the online bid set system 104, via webpage interface, to add this listing to either a new or existing bid set 108. The system sorts the listings in the bid set according to the priorities assigned to them, either by the system or the user 110. The system then accesses the online auction and bids on the highest priority bid 112. The system checks to see if the bid won the auction 114.

If the bid did not win the auction (i.e. someone else placed a higher bid), then the system increases the bid by a preset amount 116. If this new bid price is not over a user selected maximum bid price 118, then the system submits a new bid at the new price 112.

If this new bid price is over a user selected maximum bid price 118 or if the listing is no longer available to be bid on (e.g. someone else won the auction), then the system removes the highest priority listing from the bid set 122 and checks to see if there are any remaining listings in the bid set 124. If there are none, then the system ends and sends the user a result 126. If there are listings remaining in the set, then the new highest priority listing is bid upon 112. Alternatively, the system could make only one bid attempt per listing at the maximum bid price rather than stepping up the price repeatedly.

If the bid did win the auction, then the system checks to see if the user has won enough listings to satisfy the user's requirements (set by the user) 120. If the user requires more listings to be bid upon 120, then the highest priority listing (i.e. the one just won) is removed 122 and more listings are bid upon 112 until the bid set is empty 124, 126 or the user has won enough listings to fill his requirements 120, 128. If the user does not require more listings to be bid upon 120, then the system finishes 128 and sends the user a report.

Figure 2:
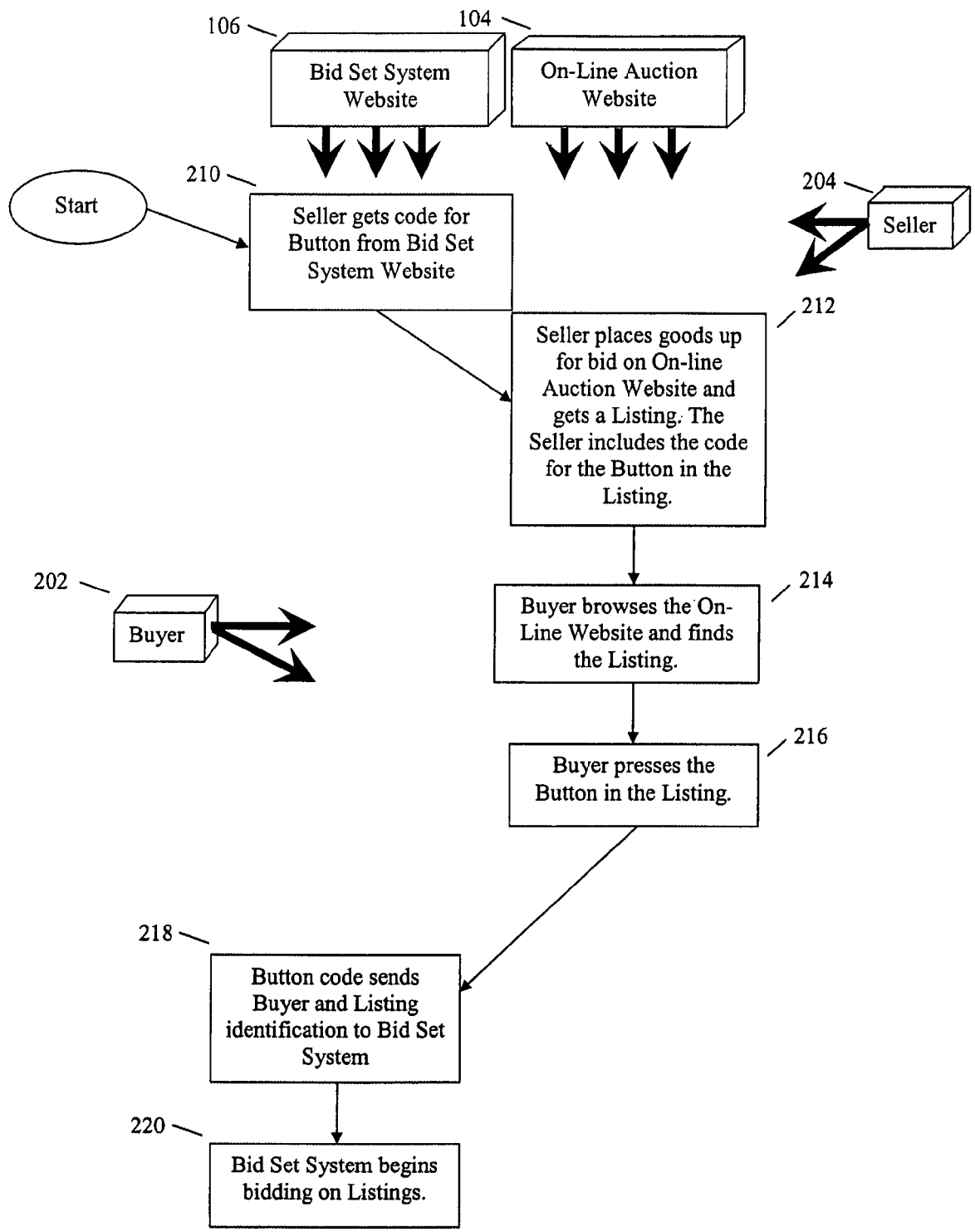
FIG. 2 is a flowchart of an embodiment of the seller-driven enhancement to the bid set system.

FIG. 2 shows how a buyer 202 and a seller 204 can take advantage of the seller-driven embodiment of the bid set system. First, a seller 204 goes to the bid set system 106 website and downloads the code for a graphical user interface (GUI) button to be placed with the seller's listing. The seller 204 then places 212 a listing for bid on an on-line auction 104 website and includes the button code with the listing. A buyer 202 browses 216 the on-line auction 104 website and finds 216 the listing with the GUI button. The buyer 202 then presses 216 or "clicks on" the GUI button. The GUI button code then sends 218 a message via the internet to the bid set system 106 web-server. The message contains identifying data on the buyer 202 and the listing. The bid set system 106 then begins bidding on listings in the bid set for the buyer 202, using a method like the one depicted in FIG. 1.

Figure 3:
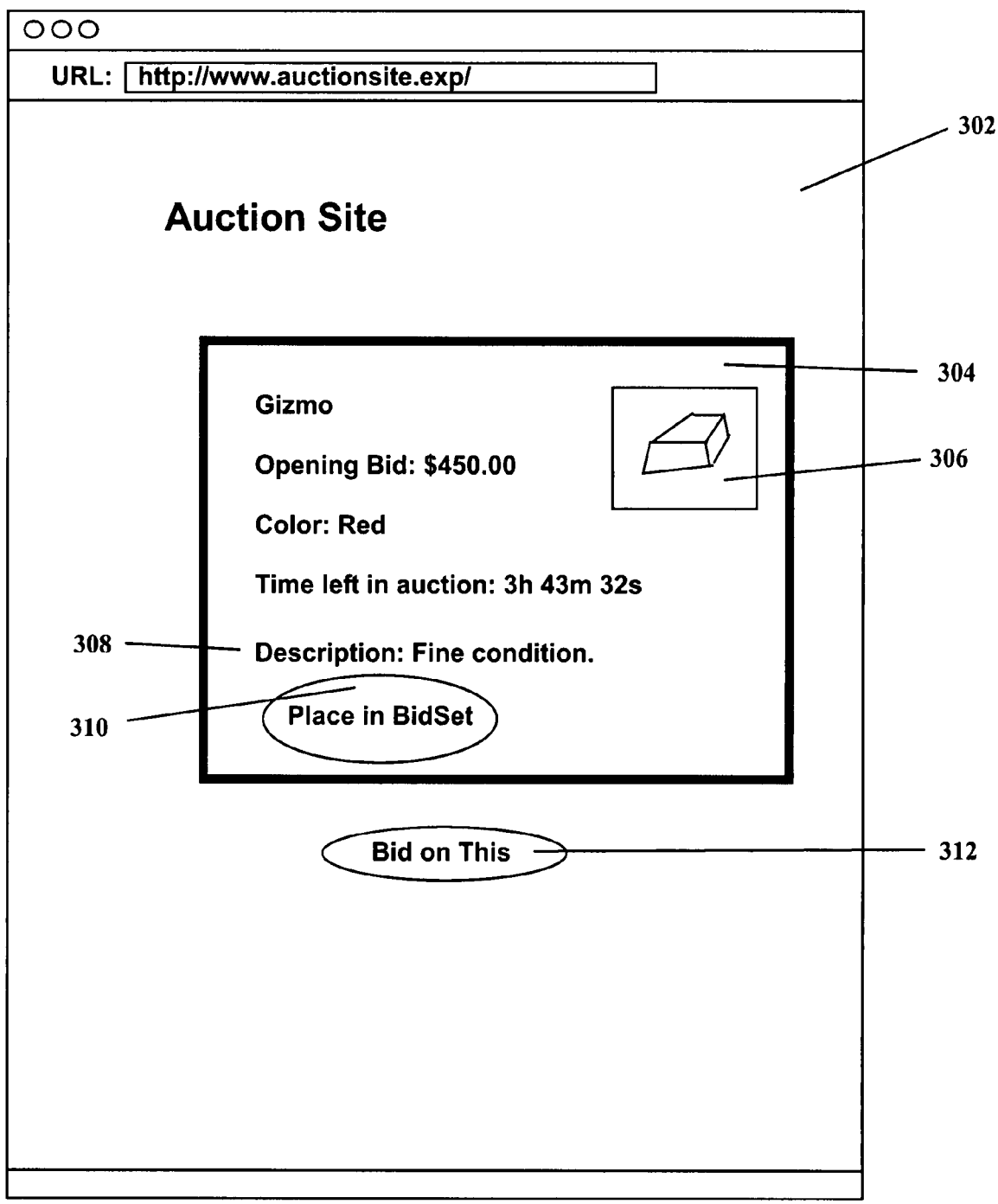
FIG. 3 is an example of the seller-driven enhancement implemented on an auction webpage.

FIG. 3 shows an embodiment of the seller-driven enhancement, specifically an embodiment of the in-listing button. In this embodiment, the seller has a listing 304 on an on-line auction webpage 302. The listing 304 contains seller-provided information and, optionally, a photo 306 of the item up for bid. In the description section 308 of the listing 304, the seller places the code provided by the bid set system. This code appears on the webpage 302 as a GUI button 310 that, when pressed, will place the item in a bid set for the buyer browsing the page. This is in contrast to the button provided by the auction system 312 that bids on the listing for the buyer without first placing it in a bid set. Alternatively, the code for the GUI button 310 could be integrated on the webpage 302 by the auction system so that the seller does not need to input the code.

Figure 4:
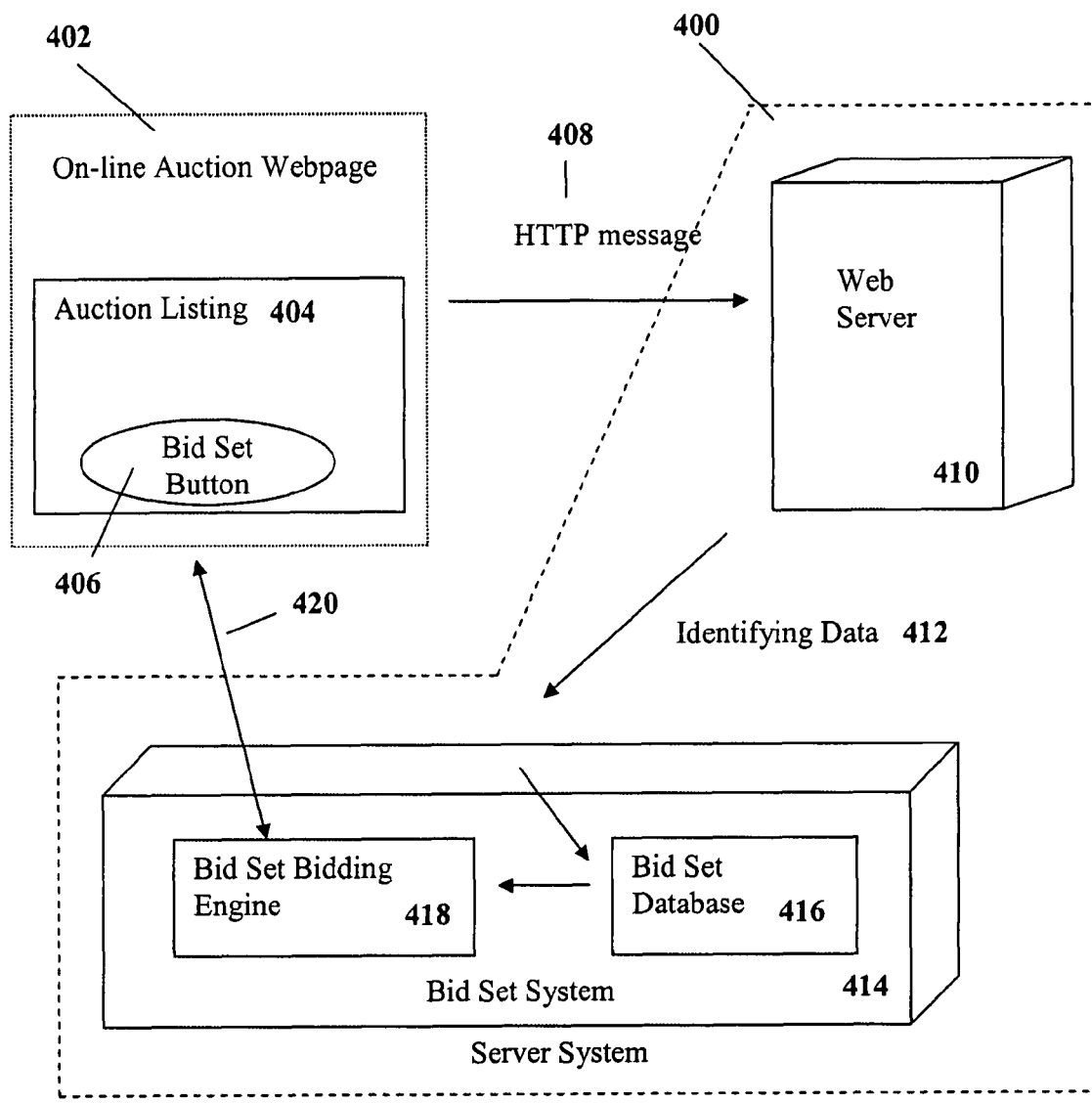
FIG. 4 is an embodiment of the bid set server system and its relationship to an on-line auction website.

FIG. 4 shows an embodiment of a computer server system 400 implementing an embodiment of the seller-driven enhancement. The buyer goes to the website of an on-line auction 402. There, the buyer finds a listing 404 the buyer wishes to bid on. With the listing 404, there is a GUI button 406 labeled in a way to let the buyer know that clicking on it will add the listing 404 to the bid set system 414. The buyer clicks on the button 406, sending an HTTP message 408 to the computer server system's 400 web server 410. The web server 410 then parses out the identifying data from the HTTP message 408 and sends that data to the bid set system 414. The bid set system 414 is preferably a computer programmed to handle the task of managing the communications with the database 416 and the on-line auction 402, as well as processing any bidding algorithms and determining the status of the bid set (i.e. if enough listings have been won or not). The identifying data is stored in a bid set database 416. The bid set bidding engine 418 then takes the identifying data from the database 416 and uses it to connect to communicate 420 with the on-line auction website 402 to bid on the listing if needed.

The disclosure has been described in general terms according to the preferred embodiments. However, people having ordinary skill in the art will understand that changes may be made to what is disclosed. Therefore, the scope of the invention is to be limited only by the following claims and their equivalents.

The invention claimed is:

1. A method for adding an on-line auction listing to a bid set from a client computer connected with a computer server system via the Internet, the method comprising:
   providing a computer adapted to run a computer software;
   providing a webpage form element on a display on the computer corresponding to an on-line auction listing thereby allowing a user to select from a plurality of options from the webpage form element;
   identifying the on-line auction listing by information provided by the webpage form element on the computer and displaying the identified on-line auction listing on the display;
   storing identifying information of the on-line auction listing into the bid set, the bid set comprising:
   identifying information of one or more online auction listings up for bid; and
   a number of listings desired to be won, the bid set being stored in a bid set database on the computer server system,
   wherein the identifying information is a listing identifier corresponding to each of the one or more online auction listings,
   wherein the identifying information is provided by a user interface element,
   wherein the bid set comprises more than one online auction listing;
   assigning a priority to each listing in the bid set database on the computer server system according to the priority; and
   running the computer software on the computer, the computer performing a task of:
   a) sorting, by way of the computer software, the more than one online auction listings according to the assigned priority;
   b) accessing, by way of the computer software, the online auction and bidding on the online auction listing assigned with the highest priority;
   c) determining, by way of the computer software, if the bid won the online auction;
   d) if the bid is won, determining, by way of the computer software, if a desired number of bids are won;
      if more listings are desired, repeating step b);
      if the desired number of bids are won, removing the highest priority listing from the bid set and sending the user a completion report;
   e) if the bid is lost, increasing, by way of the computer software, a bidding price by a set amount, the increased bidding price being less than a maximum price a user is willing to pay.

2. The method of claim 1, wherein the user interface element is coded within the on-line auction listing.

3. The method of claim 1, wherein the task of bidding on at least one on-line auction listing is performed without user confirmation.

4. The method of claim 1, wherein the user interface element comprises at least one of the following: a graphical user interface button, a graphical user interface check box, and a graphical user interface option button.

5. The method of claim 1, wherein storing the on-line auction listing further comprises: requiring confirmation from a person associated with the bid set before storing the on-line auction listing.

6. The method of claim 1, additionally comprising:
   providing a list comprised of additional on-line auction listings wherein the additional on-line auction listings have common characteristics with the on-line auction listing.

7. The method of claim 6, wherein the list is sorted so that the additional on-line auction listings that have the same seller as the on-line auction listing are placed at the top of the list or otherwise highlighted or given preferential treatment either by special placement, different bordering, different font size, different font color, special labeling, or a combination of any of these.

8. A method for adding an on-line auction listing to a bid set from a client computer connected with a computer server system via the Internet, the method comprising:

provided a computer adapted to run a computer software;

providing a user interface element on the computer corresponding to an on-line auction listing on an on-line auction website thereby allowing a user to select the on-line auction listing from the user interface element;

identifying the on-line auction listing by information provided by the user interface element on the computer and displaying the identified on-line auction listing on the display;

storing identifying information of the on-line auction listing into the bid set, the bid set comprising:

identifying information of one or more online auction listings up for bid; and a number of listings desired to be won, the bid set being stored in a the bid set database on the computer server system, wherein the identifying information is provided by a user interface element, wherein when the bid set comprises more than one online auction listing;

assigning a priority to each listing and sorting the listing in the bid set database on the computer server system according to the priority; and running the computer software on the computer, the computer performing a task of:

a) sorting, by way of the computer software, the more than one online auction listings according to the assigned priority;

b) accessing, by way of the computer software, the online auction and bidding on the online auction listing assigned with the highest priority;

c) determining, by way of the computer software, if the bid won the online auction;

d) if the bid is won, determining, by way of the computer software, if a desired number of bids are won;

if more listings are desired, repeating step b);

if the desired number of bids are won, removing the highest priority listing from the bid set and sending the user a completion report;

e) if the bid is lost, increasing, by way of the computer software, a bidding price by a set amount, the increased bidding price being less than a maximum price a user is willing to pay.

9. The method of claim 1, further comprising showing a graphical user representation of a button configured to be pressed by a user to allow the user to add the identified on-line auction listing to the bid set.

10. The method of claim 8, further comprising showing a graphical user representation of a button configured to be pressed by a user to allow the user to add the identified on-line auction listing to the bid set.

11. The method of claim 1, wherein the online auction listings are automatically added to the bid set without user confirmation.

12. The method of claim 1, further comprising assigning a bidding price to each listing in the bid set, the bidding price for each listing being different for different items in the bid set.

13. The method of claim 8, wherein the online auction listings are automatically added to the bid set without user confirmation.

14. The method of claim 8, further comprising assigning a bidding price to each listing in the bid set, the bidding price for each listing being different for different items in the bid set.

* * * * *